United States Patent
Kim et al.

(10) Patent No.: US 10,986,610 B2
(45) Date of Patent: Apr. 20, 2021

(54) METHOD FOR TRANSMITTING AND RECEIVING SIGNAL IN WIRELESS COMMUNICATION SYSTEM AND APPARATUS THEREFOR

(71) Applicant: LG ELECTRONICS INC., Seoul (KR)

(72) Inventors: Youngtae Kim, Seoul (KR); Hanbyul Seo, Seoul (KR); Yunjung Yi, Seoul (KR); Hyukjin Chae, Seoul (KR); Hyunmyung Woo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 2 days.

(21) Appl. No.: 16/473,607

(22) PCT Filed: Dec. 28, 2017

(86) PCT No.: PCT/KR2017/015661
§ 371 (c)(1),
(2) Date: Jun. 25, 2019

(87) PCT Pub. No.: WO2018/124776
PCT Pub. Date: Jul. 5, 2018

(65) Prior Publication Data
US 2020/0154397 A1    May 14, 2020

Related U.S. Application Data

(60) Provisional application No. 62/440,371, filed on Dec. 29, 2016, provisional application No. 62/443,814, (Continued)

(51) Int. Cl.
*H04W 72/02* (2009.01)
*H04W 72/04* (2009.01)
(Continued)

(52) U.S. Cl.
CPC ....... *H04W 72/02* (2013.01); *H04W 72/0406* (2013.01); *H04W 72/1278* (2013.01); *H04W 92/18* (2013.01)

(58) Field of Classification Search
CPC ..... H04W 72/04; H04W 4/70; H04W 72/048; H04W 72/12; H04W 72/121;
(Continued)

(56) References Cited

U.S. PATENT DOCUMENTS

2011/0255450 A1* 10/2011 Wang ................ H04W 72/0493
370/280
2013/0155962 A1* 6/2013 Hakola ................ H04W 76/14
370/329
(Continued)

FOREIGN PATENT DOCUMENTS

| WO | 2015166661 | 11/2015 |
| WO | 2016/006903 | 1/2016 |
| WO | 2016/108456 | 7/2016 |

OTHER PUBLICATIONS

PCT International Application No. PCT/KR2017/015661, Written Opinion of the International Searching Authority dated Mar. 22, 2018, 19 pages.
(Continued)

*Primary Examiner* — Wutchung Chu
(74) *Attorney, Agent, or Firm* — Lee, Hong, Degerman, Kang & Waimey

(57) ABSTRACT

The present invention relates to a method for transmitting, by a terminal, a signal in a wireless communication system and an apparatus therefor. More particularly, the method comprises: a step of receiving a resource pool setting indicating a plurality of resource groups for transmitting and receiving, by a terminal, a signal from a first base station; and a step of transmitting a message by using a specific resource unit within a specific resource group among the
(Continued)

plurality of resource groups according to the resource pool setting, depending on dynamic resource allocation information, wherein each of the plurality of resource groups is configured by successively allocating M resource units (where M is a natural number, M>0), in which each of the resource units is set for one of an uplink, a downlink, or a sidelink, and wherein the dynamic resource allocation information indicates that the message is to be transmitted through an N-th resource unit among the resource units within the specific resource group (where N is a natural number, M≥N>0).

7 Claims, 14 Drawing Sheets

Related U.S. Application Data filed on Jan. 9, 2017, provisional application No. 62/449,112, filed on Jan. 23, 2017, provisional application No. 62/453,490, filed on Feb. 1, 2017.

(51) Int. Cl.
*H04W 72/12* (2009.01)
*H04W 92/18* (2009.01)

(58) Field of Classification Search
CPC ..... H04W 72/14; H04W 72/00; H04W 72/02; H04W 72/0406; H04W 72/042; H04W 72/1278; H04W 92/18
See application file for complete search history.

(56) References Cited

U.S. PATENT DOCUMENTS

| | | | |
|---|---|---|---|
| 2013/0322413 A1* | 12/2013 | Pelletier | H04L 5/0091 370/336 |
| 2014/0235234 A1* | 8/2014 | Jang | H04W 76/23 455/426.1 |
| 2015/0009910 A1* | 1/2015 | Ryu | H04W 72/04 370/329 |
| 2015/0016428 A1* | 1/2015 | Narasimha | H04W 72/1215 370/336 |
| 2015/0223217 A1* | 8/2015 | Chen | H04W 72/044 370/329 |
| 2015/0305046 A1* | 10/2015 | Shin | H04W 52/383 370/329 |
| 2015/0327315 A1* | 11/2015 | Xue | H04L 5/0005 370/330 |
| 2016/0295620 A1 | 10/2016 | Lindoff et al. | |
| 2017/0013605 A1* | 1/2017 | Li | H04W 76/14 |
| 2017/0055265 A1* | 2/2017 | Wei | H04B 17/318 |
| 2017/0230915 A1* | 8/2017 | Kim | H04W 52/34 |
| 2018/0213438 A1* | 7/2018 | Muraoka | H04W 72/0406 |
| 2018/0270801 A1* | 9/2018 | Novlan | H04W 56/0015 |
| 2019/0173612 A1* | 6/2019 | Kimura | H04W 56/001 |
| 2020/0221398 A1* | 7/2020 | Ryu | H04W 52/367 |

OTHER PUBLICATIONS

Huawei, et al., "Enhancements of Uplink SPS for Uu-based V2X", 3GPP TSG RAN WG2 Meeting #95, R2-164919, Aug. 2016, 5 pages.

NTT Docomo, "(E)PDCCH for sidelink SPS configuration switching", 3GPP TSG RAN WG1 Meeting #86, R1-167358, Aug. 2016, 6 pages.

Huawei, et al., "Remaining details of resource pool logical indexing", 3GPP TSG RAN WG1 Meeting #87, R1-1611134, Nov. 2016, 3 pages.

European patent application No. 17888639.6, European search report dated Jul. 3, 2020, 9 pages.

* cited by examiner

--PRIOR ART--

(a) Control-plane protocol stack (b) User-plane protocol stack (a)

(b)

METHOD FOR TRANSMITTING AND RECEIVING SIGNAL IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2017/015661, filed on Dec. 28, 2017, which claims the benefit of U.S. Provisional Application Nos. 62/440,371, filed on Dec. 29, 2016, 62/443,814, filed on Jan. 9, 2017, 62/449,112, filed on Jan. 23, 2017, and 62/453,490, filed on Feb. 1, 2017, the contents of which are all hereby incorporated by reference herein in their entireties.

TECHNICAL FIELD

The present disclosure relates to a wireless communication system, and more particularly to, a method of transmitting and receiving a signal for new Radio Access Technology (RAT) in a wireless communication system and apparatus therefor.

BACKGROUND ART

As an example of a wireless communication system to which the present disclosure is applicable, a 3rd generation partnership project long term evolution (3GPP LTE) (hereinafter, referred to as 'LTE') communication system will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several UEs. Different cells may be set to provide different bandwidths. Also, one base station controls data transmission and reception for a plurality of UEs. The base station transmits downlink (DL) scheduling information of downlink data to the corresponding UE to notify the corresponding UE of time and frequency domains to which data will be transmitted and information related to encoding, data size, and hybrid automatic repeat and request (HARQ). Also, the base station transmits uplink (UL) scheduling information of uplink data to the corresponding UE to notify the corresponding UE of time and frequency domains that can be used by the corresponding UE, and information related to encoding, data size, and HARQ. An interface for transmitting user traffic or control traffic may be used between the base stations. A Core Network (CN) may include the AG and a network node or the like for user registration of the UE. The AG manages mobility of the UE on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the UE, etc. are required.

DISCLOSURE

Technical Problem

Based on the above discussion, a method of transmitting and receiving a signal for new RAT in a wireless communication system and apparatus therefor will be described.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided is a method of transmitting a signal by a User Equipment (UE) in a wireless communication system. The method may include: receiving, from a first Base Station (BS), a resource pool configuration indicating a plurality of resource groups for signal transmission and reception of the UE; and transmitting a message using a specific resource unit in a specific resource group among the plurality of resource groups indicated by the resource pool configuration based on dynamic resource allocation information. Each of the plurality of resource groups may be configured by continuously allocating M resource units (where M is a natural number and M>0). Each of the resource units may be configured for one of uplink, downlink, and sidelink. The dynamic resource allocation information may indicate that the message is to be transmitted using an N-th resource unit (where N is a natural number and M≥N>0) among resource units in the specific resource group.

The message may be a sidelink message or a message for uplink Semi-Persistent Scheduling (SPS).

The dynamic resource allocation information may be transmitted through Radio Resource Control (RRC) signaling.

The dynamic resource allocation information may indicate the specific resource unit within a latency range.

The dynamic resource allocation information may further include dynamic resource allocation information for an external UE, which is transmitted from a second BS to the first BS through backhaul signaling.

In another aspect of the present disclosure, provided is a User Equipment (UE) for transmitting a signal in a wireless communication system. The UE may include: a radio frequency unit; and a processor. The processor may be configured to: receive, from a first Base Station (BS), a resource pool configuration indicating a plurality of resource groups for signal transmission and reception of the UE; and transmit a message using a specific resource unit in a specific resource group among the plurality of resource groups indicated by the resource pool configuration based on dynamic resource allocation information. Each of the plurality of resource groups may be configured by continuously allocating M resource units (where M is a natural number and M>0). Each of the resource units may be configured for one of uplink, downlink, and sidelink. The dynamic resource allocation information may indicate that the message is to be transmitted using an N-th resource unit (where N is a natural number and M≥N>0) among resource units in the specific resource group.

The UE is capable of communicating with at least one of another UE, a UE related to an autonomous driving vehicle, a base station or a network.

Advantageous Effects

According to the present disclosure, signal transmission and reception for new RAT can be efficiently performed.

It will be appreciated by persons skilled in the art that the effects that can be achieved through the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the disclosure and are incorporated in and constitute a part of this specification, illustrate embodiments of the disclosure and together with the description serve to explain the principles of the disclosure.

BEST MODE

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present disclosure are not limited to the 3GPP LTE/LTE-A. Also, specific terminologies hereinafter used in the embodiments of the present disclosure are provided to assist understanding of the present disclosure, and various modifications may be made in the specific terminologies within the range that they do not depart from technical spirits of the present disclosure.

Figure 1:
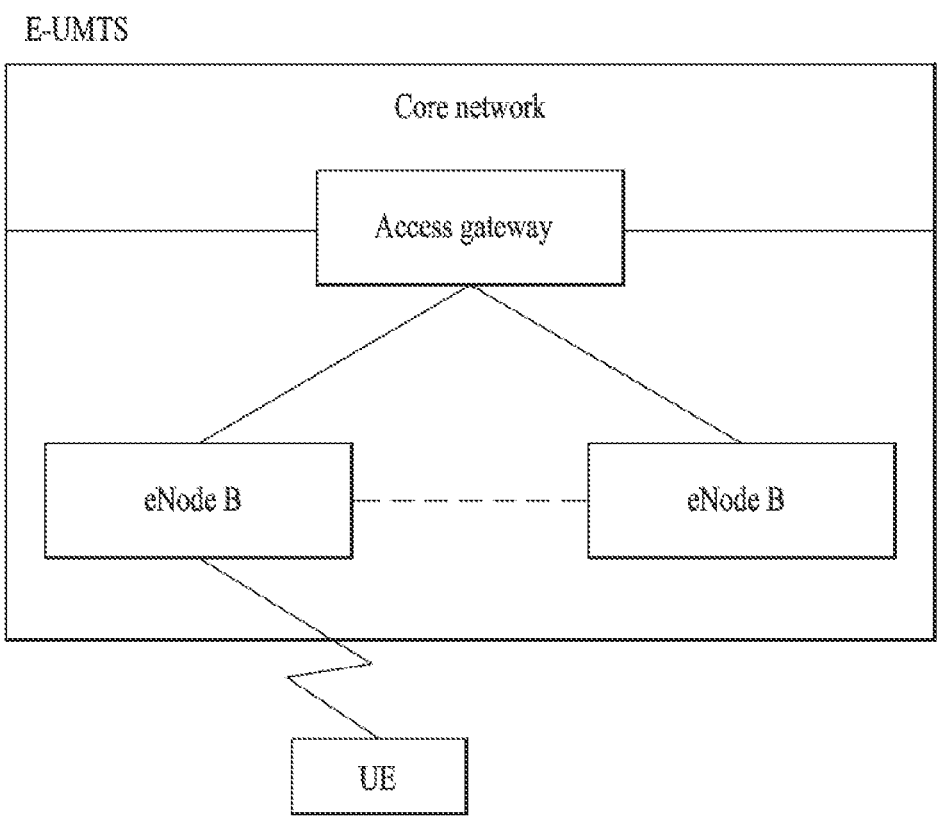
FIG. 1 schematically illustrates an E-UMTS network structure as an example of a wireless communication system.
Figure 2:
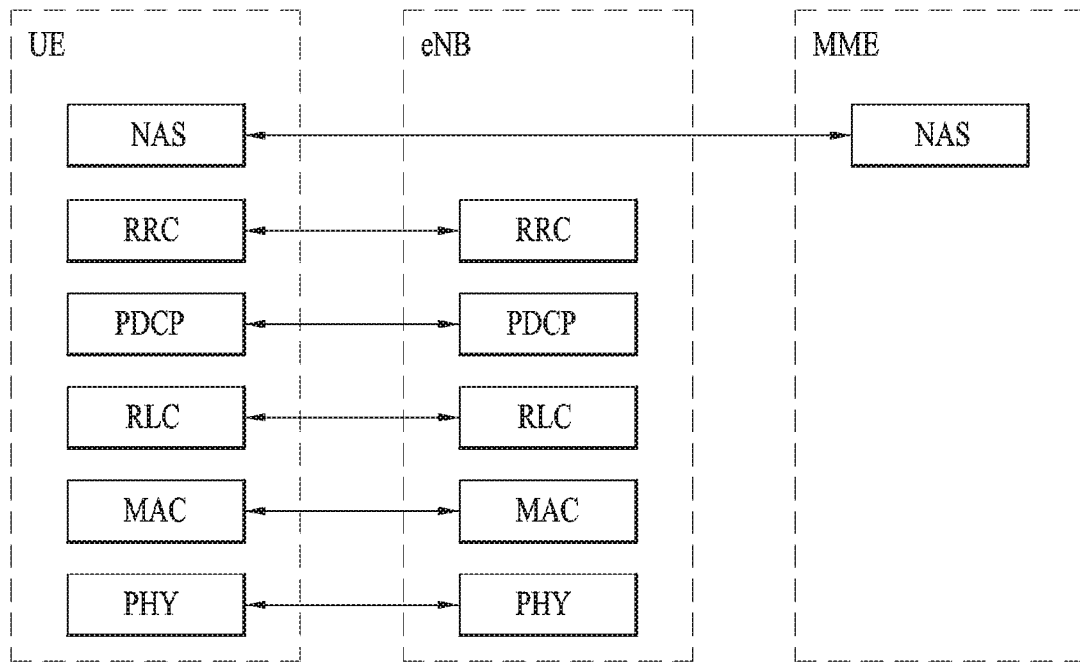
FIG. 2 illustrates control plane and user plane structures of a radio interface protocol between a UE and an E-UTRAN on the basis of the 3GPP wireless access network standard.
Figure 2:
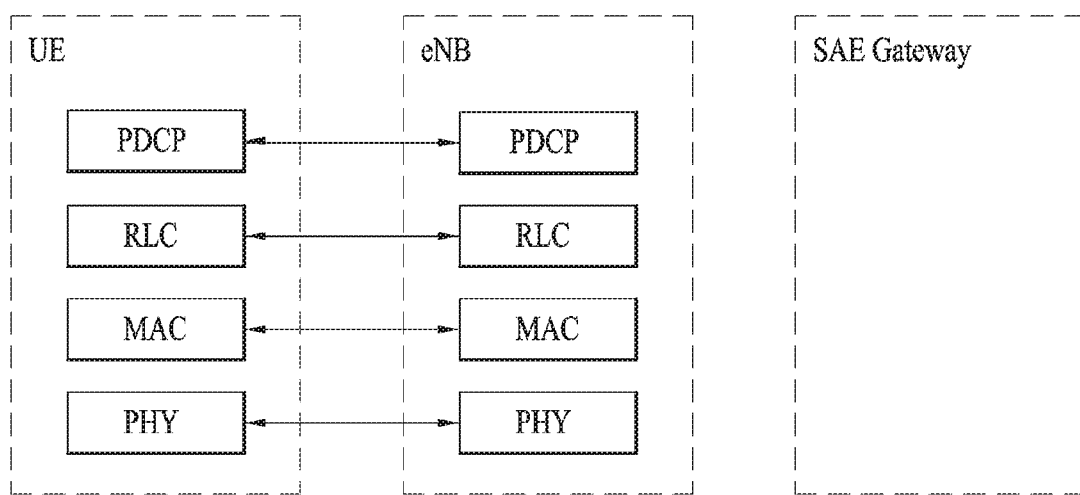

FIG. 2 is a diagram illustrating structures of a control plane and a user plane of a radio interface protocol between a UE and E-UTRAN based on the 3GPP radio access network standard. The control plane means a passageway where control messages are transmitted, wherein the control messages are used by the UE and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in downlink and is modulated in accordance with a single carrier frequency division multiple access (SC-FDMA) scheme in uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, reconfiguration and release of radio bearers ('RBs') to be in charge of controlling the logical, transport and physical channels. In this case, the RB means a service provided by the second layer for the data transfer between the UE and the network. To this end, the RRC layers of the UE and the network exchange RRC message with each other. If the RRC layer of the UE is RRC connected with the RRC layer of the network, the UE is in an RRC connected mode. If not so, the UE is in an RRC idle mode. A non-access stratum (NAS) layer located above the RRC layer performs functions such as session management and mobility management.

One cell constituting a base station (eNB) is set to one of bandwidths of 1.4, 3.5, 5, 10, 15, and 20 MHz and provides a downlink or uplink transmission service to several UEs. At this time, different cells may be set to provide different bandwidths.

As downlink transport channels carrying data from the network to the UE, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the UE to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
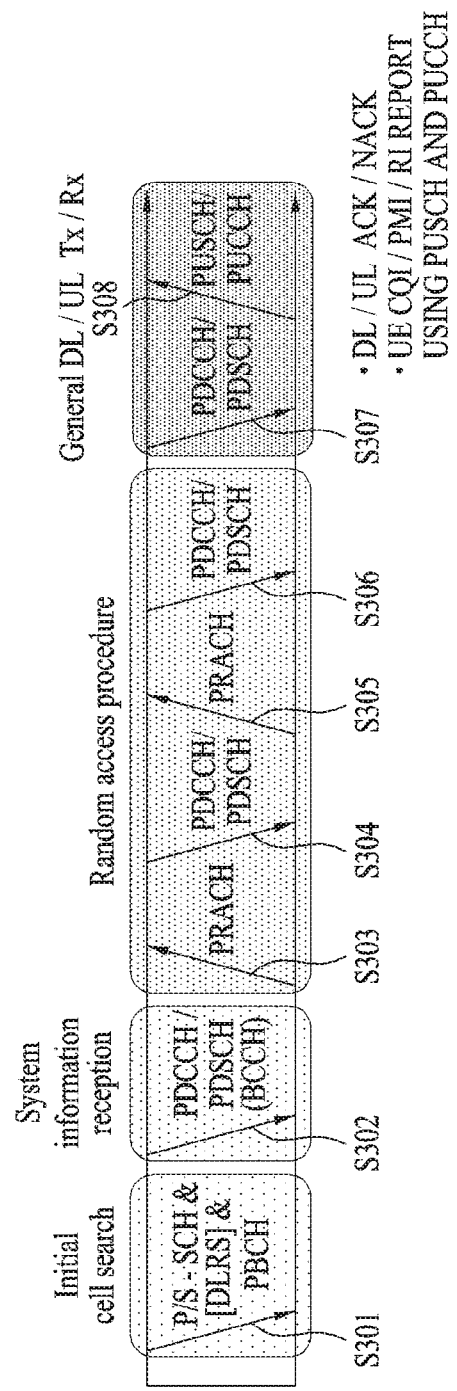
FIG. 3 illustrates physical channels used in a 3GPP system and a general signal transmission method using the same.

FIG. 3 is a diagram illustrating physical channels used in a 3GPP LTE system and a general method for transmitting a signal using the physical channels.

The UE performs initial cell search such as synchronizing with the base station when it newly enters a cell or the power is turned on at step S301. To this end, the UE synchronizes with the base station by receiving a primary synchronization channel (P-SCH) and a secondary synchronization channel (S-SCH) from the base station, and acquires information such as cell ID, etc. Afterwards, the UE may acquire broadcast information within the cell by receiving a physical broadcast channel (PBCH) from the base station. Meanwhile, the UE may identify a downlink channel status by receiving a downlink reference signal (DL RS) at the initial cell search step.

The UE which has finished the initial cell search may acquire more detailed system information by receiving a physical downlink shared channel (PDSCH) in accordance with a physical downlink control channel (PDCCH) and information carried in the PDCCH at step S302.

Afterwards, the UE may perform a random access procedure (RACH) such as steps S303 to S306 to complete access to the base station. To this end, the UE may transmit a preamble through a physical random access channel (PRACH) (S303) and receive a response message to the preamble through the PDCCH and the PDSCH corresponding to the PDCCH (S304). In case of a contention based RACH, the UE may perform a contention resolution procedure such as transmission (S305) of additional physical random access channel and reception (S306) of the physical downlink control channel and the physical downlink shared channel corresponding to the physical downlink control channel.

The UE which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the UE to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the UE may non-periodically transmit the UCI through the PUSCH in accordance with request/command of the network.

Figure 4:
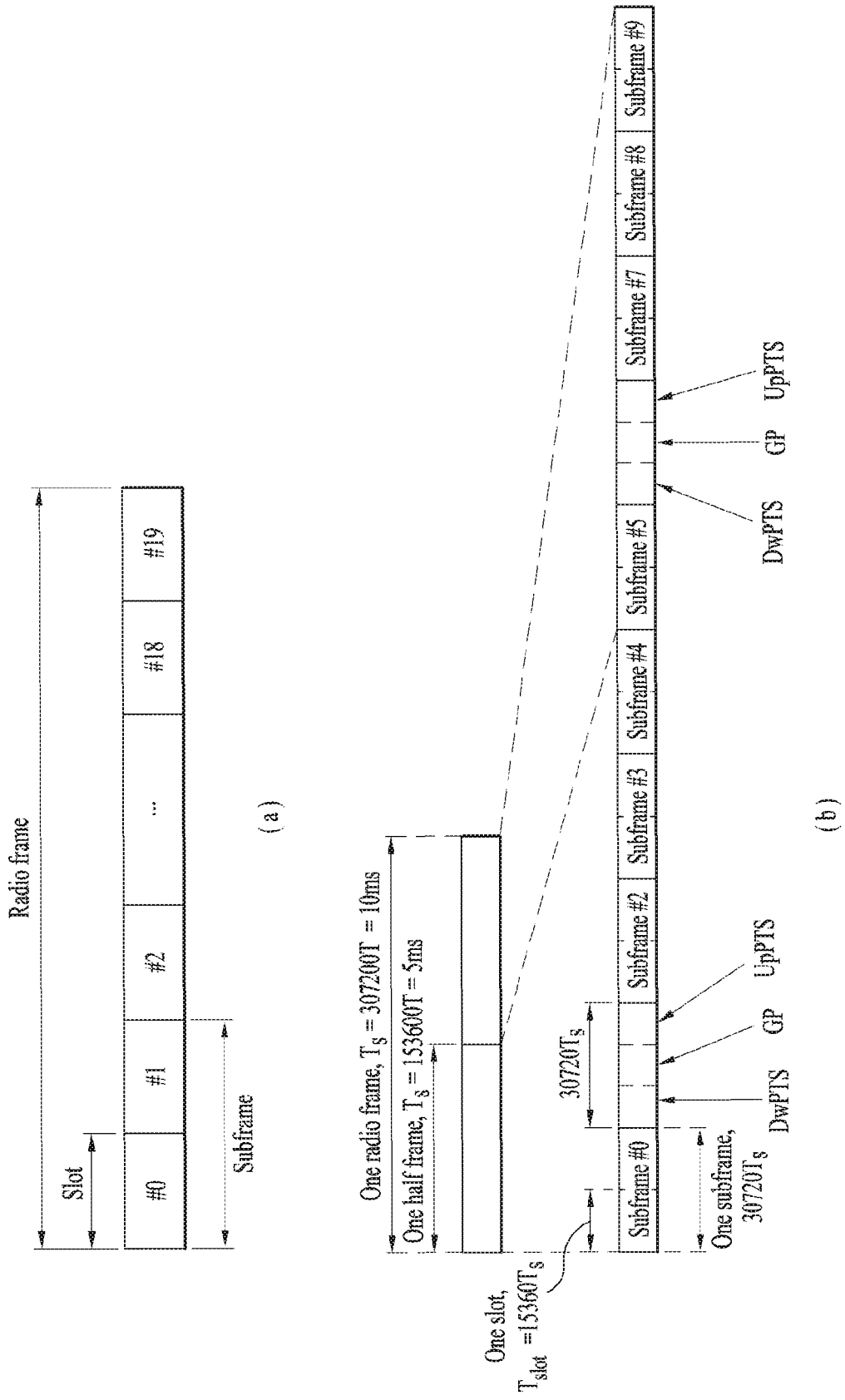
FIG. 4 illustrates a radio frame structure used in LTE.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the UE moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the UE. The UpPTS is used for channel estimation at the base station and uplink transmission synchronization of the UE. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000 \times 2048)$, and the other region is configured for the guard period.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
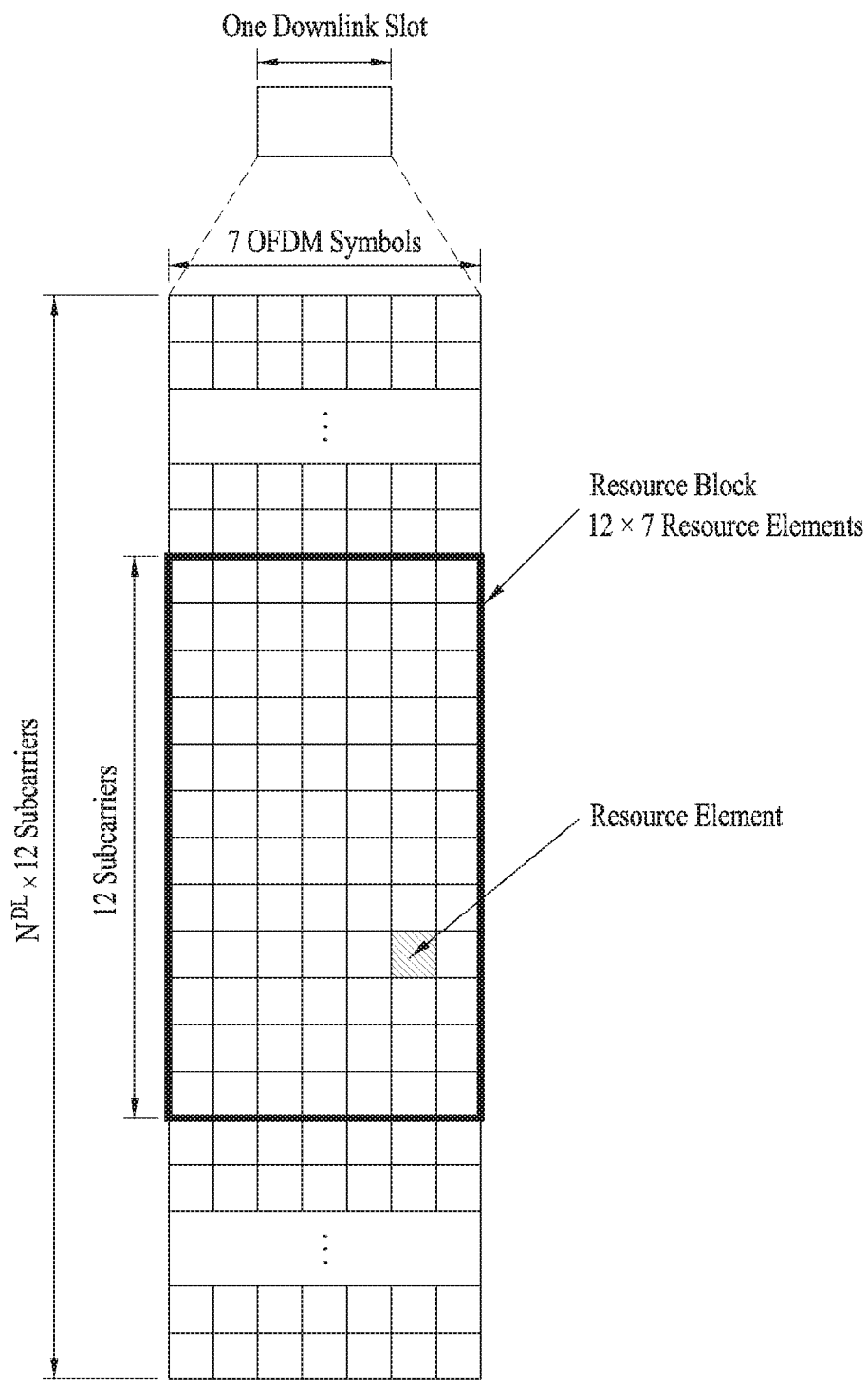
FIG. 5 illustrates a resource grid for a downlink slot.

FIG. 5 illustrates a resource grid for a downlink slot.

Referring to FIG. 5, a DL slot includes $N\_symb^{DL}$ OFDM symbols in a time domain and $N\_RB^{DL}$ resource blocks in a frequency domain. Since each of the resource blocks includes $N\_SC^{RB}$ subcarriers, the DL slot includes $N\_RB^{DL} \times N\_SC^{RB}$ subcarriers in the frequency domain. Although FIG. 5 shows an example in which the DL slot includes 7 OFDM symbols and the resource block includes 12 subcarriers, the present disclosure is not limited thereto. For instance, the number of OFDM symbols included in the DL slot can vary depending to a length of a cyclic prefix (CP).

Each element on a resource grid is referred to as a resource element (RE) and a single resource element is indicated by one OFDM symbol index and one subcarrier index. A single RB is configured with $N\_symb^{DL} \times N\_SC^{RB}$ resource elements. The number ($N\_RB^{DL}$) of resource blocks included in the DL slot depends on a DL transmission bandwidth configured in a cell.

Figure 6:
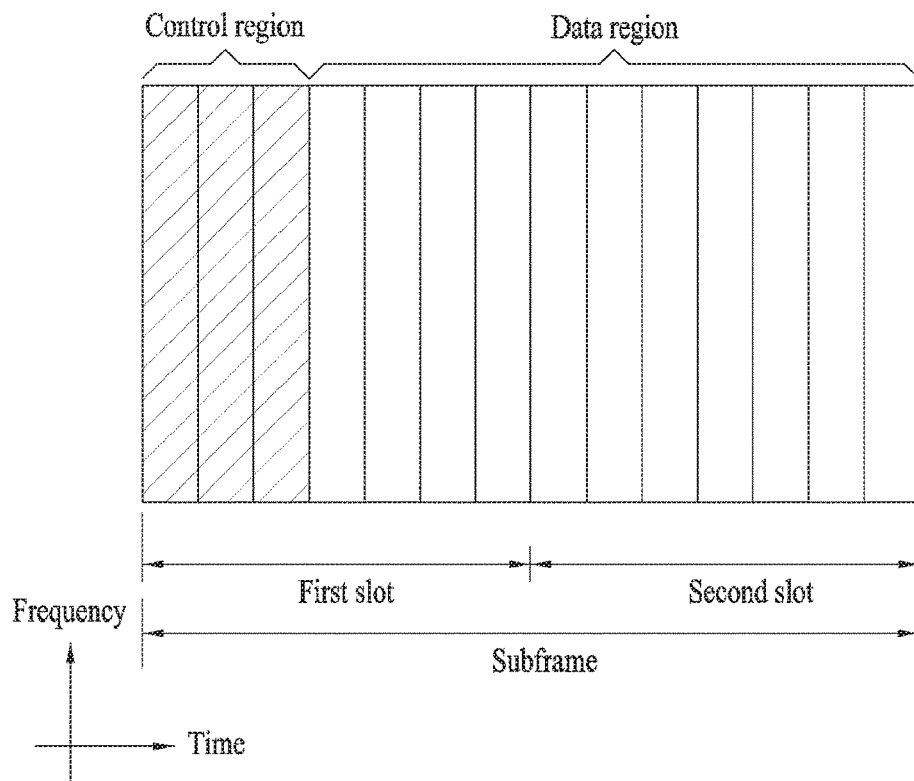
FIG. 6 illustrates a structure of a downlink radio frame used in an LTE system.

FIG. 6 illustrates a structure of a downlink radio frame.

Referring to FIG. 6, up to 3 (or 4) OFDM symbols located at a head part of a first slot of a subframe correspond to a control region to which a control channel is assigned. And, the rest of OFDM symbols correspond to a data region to which PDSCH (physical downlink shared channel) is assigned. For example, DL control channels used in the LTE system may include a PCFICH (physical control format indicator channel), a PDCCH (physical downlink control channel), a PHICH (physical hybrid ARQ indicator channel) and the like. The PCFICH is transmitted on a first OFDM symbol of a subframe and carries information on the number of OFDM symbols in the subframe used for control channel transmission. The PHICH carries an HARQ ACK/NACK (hybrid automatic repeat request acknowledgment/negative-acknowledgment) signal in response to UL transmission.

Control information transmitted on the PDCCH is called DCI (downlink control information). The DCI includes resource allocation information and other control information for a UE or a UE group. For instance, the DCI may include UL/DL scheduling information, UL transmission (Tx) power control command and the like.

The PDCCH carries transmission format and resource allocation information of a DL-SCH (downlink shared channel), transmission format and resource allocation information of a UL-SCH (uplink shared channel), paging information on a PCH (paging channel), system information on a DL-SCH, resource allocation information of a higher-layer control message such as a random access response transmitted on a PDSCH, a Tx power control command set for individual UEs in a UE group, a Tx power control command, activation indication information of a VoIP (voice over IP) and the like. A plurality of PDCCHs may be transmitted in a control region. A UE can monitor a plurality of PDCCHs. The PDCCH is transmitted on aggregation of one or more consecutive CCEs (control channel elements). In this case, the CCE is a logical assignment unit used in providing the PDCCH with a coding rate based on a radio channel state. The CCE corresponds to a plurality of REGs (resource element groups). The PDCCH format and the number of PDCCH bits are determined depending on the number of CCEs. A base station determines the PDCCH format in accordance with DCI to be transmitted to a UE and attaches CRC (cyclic redundancy check) to control information. The CRC is masked with an identifier (e.g., RNTI (radio network temporary identifier)) in accordance with an owner or a purpose of use. For instance, if a PDCCH is provided for a specific UE, CRC may be masked with an identifier (e.g., C-RNTI (cell-RNTI)) of the corresponding UE. If a PDCCH is provided for a paging message, CRC may be masked with a paging identifier (e.g., P-RNTI (paging-RNTI)). If a PDCCH is provided for system information (particularly, SIC (system information block)), CRC may be masked with an SI-RNTI (system information-RNTI). In addition, if a PDCCH is provided for a random access response, CRC may be masked with an RA-RNTI (random access-RNTI).

Figure 7:
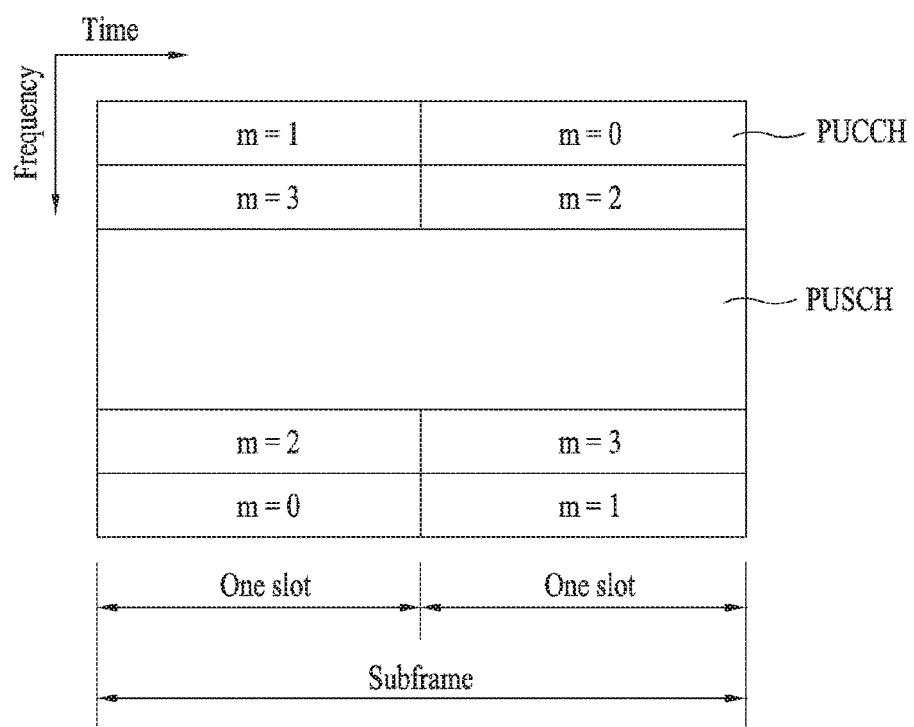
FIG. 7 illustrates a structure of an uplink radio frame used in an LTE system.

FIG. 7 illustrates a structure of an uplink subframe used in an LTE system.

Referring to FIG. 7, an uplink subframe includes a plurality (e.g., 2 slots) of slots. Each of the slots may include a different number of SC-FDMA symbols depending on a length of CP. The UL subframe may be divided into a data region and a control region in the frequency domain. The data region includes a PUSCH and is used to transmit such a data signal as audio and the like. The control region includes a PUCCH and is used to transmit UCI (uplink control information). The PUCCH includes an RB pair located at both ends of the data region on a frequency axis and is hopped on a slot boundary.

The PUCCH can be used to transmit the following control information.

SR (scheduling request): This is information used to request a UL-SCH resource and is transmitted using an OOK (on-off keying) scheme.

HARQ ACK/NACK: This is a response signal in response to a DL data packet on a PDSCH and indicates whether the DL data packet has been successfully received. 1-bit ACK/NACK is transmitted as a response to a single downlink codeword and 2-bit ACK/NACK is transmitted as a response to two downlink codewords.

CSI (channel state information): This is feedback information on a downlink channel. The CSI includes a channel quality indicator (CQI). MIMO (multiple input multiple output) related feedback information includes a rank indicator (RI), a precoding matrix indicator (PMI), a precoding type indicator (PTI) and the like. 20-bit is used in each subframe.

The amount of control information (UCI) that a UE can transmit in a subframe depends on the number of SC-FDMA symbols available for transmission of the control information. The SC-FDMA symbols available for the transmission of the control information correspond to the rest of SC-FDMA symbols except SC-FDMA symbols used for transmitting a reference signal in the subframe. In case of a subframe in which a sounding reference signal (SRS) is configured, the last SC-FDMA symbol of the subframe is excluded from the SC-FDMA symbols available for the transmission of the control information. The reference signal is used for coherent detection of a PUCCH.

Hereinafter, D2D (UE-to-UE) communication will be described.

A D2D communication scheme can be mainly classified as a scheme supported by a network/coordination station (e.g., base station) and a scheme not supported by the network/coordination station.

Figure 8:
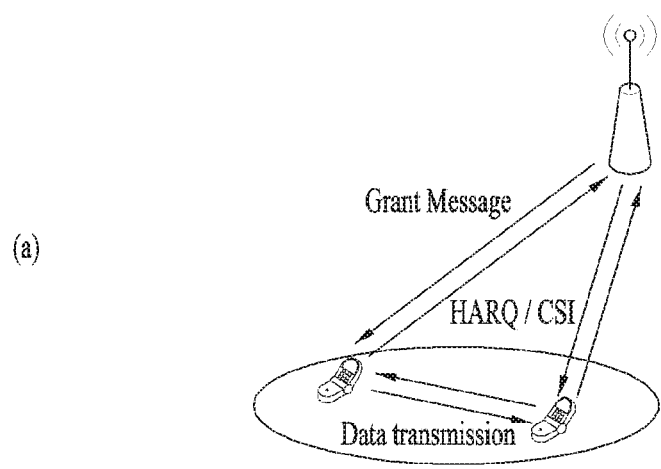
FIG. 8 is a reference diagram for explaining D2D (UE-to-UE) communication.
Figure 8:
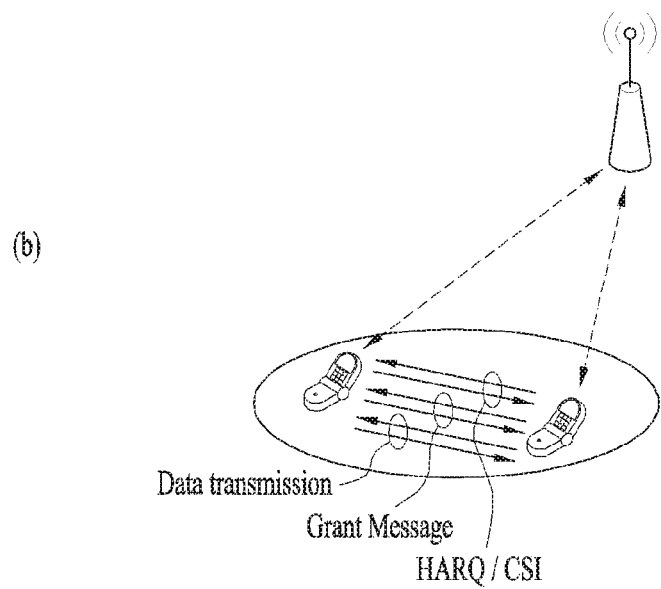

Referring to FIG. 8, FIG. 8 (*a*) illustrates a scheme in which the network/coordination station intervenes in transmission and reception of control signals (e.g., grant message), HARQ, channel state information, etc. and UEs that perform D2D communication transmit and receive data only. On the other hand, FIG. 8 (*b*) illustrates a scheme in which the network provides minimum information (e.g., D2D connection information available in a corresponding cell) only but the UEs that perform D2D communication establish links to transmit and receive data.

Figure 9:
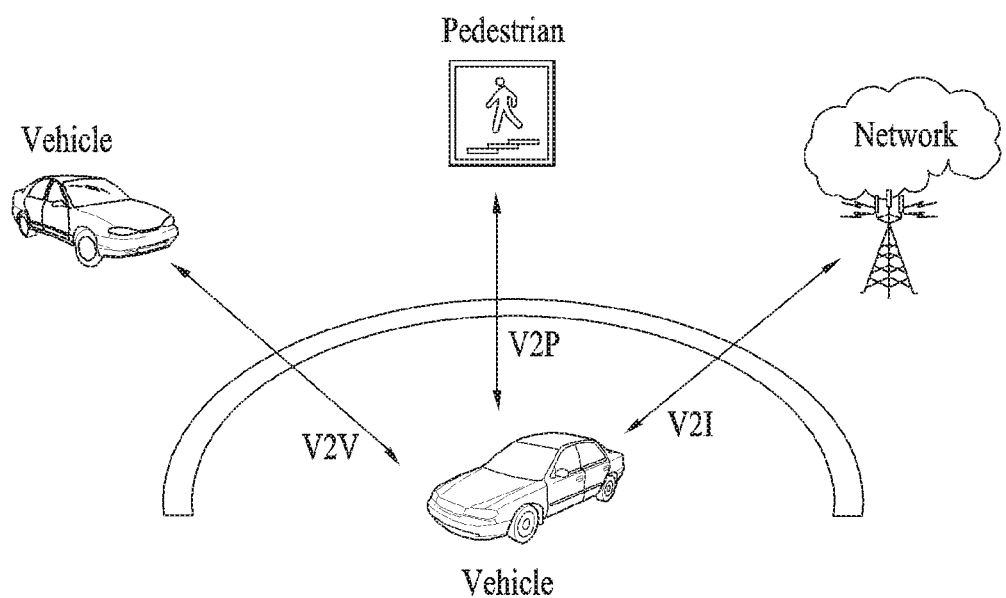
FIG. 9 is a reference diagram for explaining a V2V scenario.

FIG. 9 is a diagram illustrating a V2X (vehicle to everything) communication environment.

If a vehicle accident occurs, many lives are lost, and serious property damage is caused. Thus, the demand for a technology capable of securing safety of pedestrians as well as safety of people in a vehicle has been increased. In addition, a technology based on hardware and software dedicated to the vehicle has been grafted onto the vehicle.

Recently, the LTE-based V2X (vehicle-to-everything) communication technology, which has been evolved from 3GPP, reflects the tendency in which the information technology (IT) is grafted onto the vehicle. A connectivity function is applied to some kinds of vehicles, and efforts are continuously made to research and develop vehicle-to-vehicle (V2V) communication, vehicle-to-infrastructure (V2I) communication, vehicle-to-pedestrian (V2P) communication, and vehicle-to-network (V2N) communication with the evolution of communication functions.

According to V2X communication, a vehicle consistently broadcasts information on its own locations, speeds, directions, etc. After receiving the broadcasted information, a nearby vehicle utilizes the information for accident prevention by recognizing movements of other adjacent vehicles.

That is, as an individual person carries a terminal such as a smartphone, a smartwatch or the like, so a specific type of UE may be installed in each vehicle. Here, a UE installed in a vehicle means a device that actually receives communication services from a communication network. For example, the UE installed in the vehicle may be accessed to an eNB in E-UTRAN and provided with communication services.

However, there are various items that should be considered for a process for implementing V2X communication in a vehicle. This is because astronomical costs are required for the installation of traffic safety facilities such as a V2X base station and the like. That is, to support V2X communication on all roads where the vehicle can move, it is necessary to install hundreds or thousands of V2X base stations or more. Moreover, since each network node accesses the Internet or a centralized control server using a wired network basically for stable communication with a server, installation and maintenance costs for the wired network are also high.

Hereinafter, resource allocation for V2X communication will be described. Although the present disclosure is described based on V2X scenarios for convenience of description, the present disclosure is applicable to other communication systems such as Device-to-Device (D2D) communication.

Figure 10:
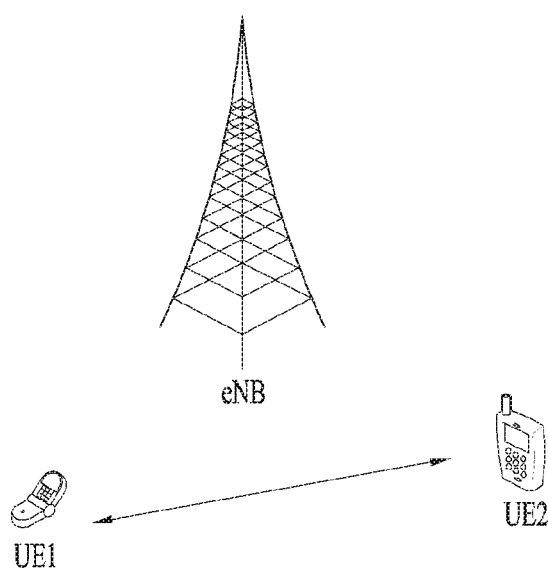
FIGS. 10 and 11 are reference diagrams for explaining a resource pool for D2D communication.

FIG. 10 is a reference diagram to describe UE-to-UE direct communication. When a UE performs communication with another UE using a direct wireless channel, as shown in FIG. 10, the present disclosure proposes a method of determining a resource to use for communication. This can be named UE-to-UE direct signal transmission/reception or Device-to-Device (D2D) communication, and further named a sidelink to be distinguished from Downlink (DL) and Uplink (UL) of the existing cellular communication. Furthermore, communication among multiple devices may be named Vehicle-to-Vehicle (V2V) communication in association with vehicles. Hence, although a UE means a user's UE (or car), if a network equipment such as an eNB transmits/receives a signal according to a UE-to-UE communication methodology, the network equipment can be regarded as a sort of UE to which the present disclosure is applicable. Moreover, an eNB can receive a D2D signal transmitted by a UE. Furthermore, a signal transmitting/receiving method of a UE designed for D2D transmission is applicable to an operation for a UE to transmit data to an eNB.

In the following description, UE1 may operate in a manner of selecting a resource unit corresponding to a specific resource from a resource pool meaning a set of a series of resources and transmitting a D2D signal using the corresponding resource unit. UE2 that is an Rx UE may receive a configuration of a resource pool for the UE1 to transmit a D2D signal and detect a signal of the UE1 within the corresponding resource pool. Here, if the UE1 is in a connection range of a base station, the UE1 can be informed of the resource pool by the base station. If the UE1 is out of the connection range of the base station, the UE1 may be informed of the resource pool by another UE or the resource pool may be determined as a previously determined resource. Generally, a resource pool is configured in a plurality of resource units. Each UE may select a single or a plurality of resource units and use the selected resource unit(s) for D2D signal transmission of its own.

Figure 11:
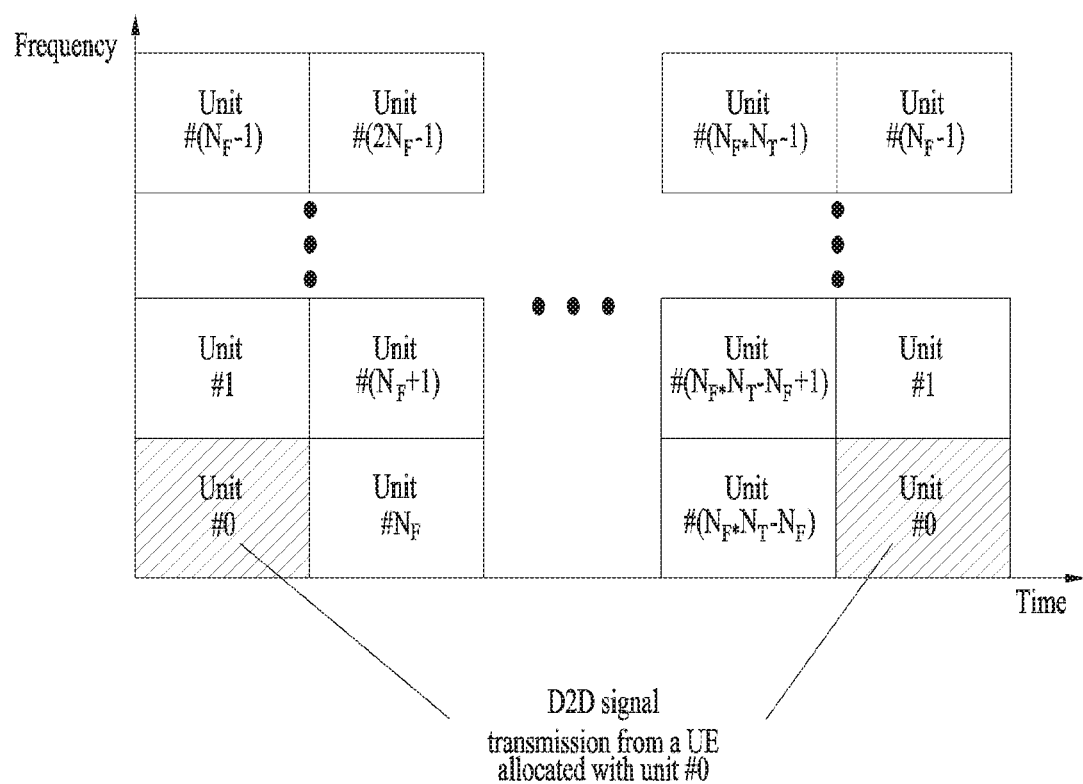

FIG. 11 shows one example of a configuration of resource unit. FIG. 11 illustrates a case that total NF*NT resource units are defined in a manner of dividing a full frequency resource into NF units and dividing a full time resource into NT units. In FIG. 11, a corresponding resource pool is repeated every NT subframes. Typically, as shown in FIG. 11, a single resource unit may appear in a manner of being repeated periodically. Or, an index of a physical resource unit, to which one logical resource unit is mapped to obtain a diversity effect in a time or frequency dimension, may change in a predetermined pattern according to a time. In such a resource unit structure, a resource pool may mean a set of resource units usable for a transmission by a UE intending to transmit a D2D signal.

Furthermore, a resource pool can be subdivided into various types. First of all, a resource pool can be divided according to a content of a transmitted D2D signal in each resource pool. For example, a content of a D2D signal can be classified as follows. And, a separate resource pool may be configured for each content.

Scheduling Assignment (SA) (or sidelink control channel): Signal including information such as a location of a resource used for transmission of a following D2D data channel by each transmitting (Tx) UE, a Modulation and Coding Scheme (MCS) required for demodulation of a data channel, an MIMO transmission methodology and the like. Such an SA signal can be transmitted on the same resource unit by being multiplexed with D2D data. In this case, an SA resource pool may mean a resource pool configured with a resource on which an SA is transmitted by being multiplexed with D2D data.

D2D data channel (sidelink shared channel): A resource pool configured with a resource used in transmitting user data by a Tx UE using a resource designated through SA. If a transmission on the same resource unit by being multiplexed with D2D data is possible, only a D2D data channel of a type except SA information is transmitted in a resource pool for the D2D data channel. So to speak, a resource element used in transmitting SA information on an individual resource unit within an SA resource pool is still used to transmit D2D data in a D2D data channel resource pool.

Discovery message (or sidelink discovery channel): A resource pool for a message through which a Tx UE enables an adjacent UE to discover the Tx UE itself by transmitting information such as an ID of the Tx UE and the like.

Synchronization signal/channel (or, sidelink synchronization signal, sidelink broadcast channel): A resource pool for a signal/channel to achieve an object that a Tx UE transmits a synchronization signal and information related to synchronization to enable an Rx (receiving) UE to match up time/frequency synchronization with that of the Tx UE.

Although SA and data may use a resource pool separated on a subframe, if a UE can simultaneously transmit SA and data in a single frame, two types of resource pools can be configured in the same subframe.

Moreover, in case that the aforementioned D2D signal content is identical, a different resource pool is usable according to a transmission/reception attribute of the D2D signal. For example, despite the same D2D data channel or discovery message, it can be divided into a different resource pool again depending on a transmission timing determining methodology (whether a D2D signal is transmitted at a reception timing of a synchronization reference signal, whether a D2D signal is transmitted by applying a constant timing advance at a repletion timing of a synchronization reference signal, etc.), a resource allocation methodology (e.g., whether a transmission resource of an individual signal is designated to an individual Tx UE by an eNB, or whether an individual Tx UE selects an individual signal transmission resource from a resource pool by itself), a signal format (e.g., the number of symbols occupied in a single subframe by each D2D signal, the number of subframes used for transmission of a single D2D signal), a signal strength from an eNB, a transmit power level of a D2D UE and the like.

For clarity of description, a method for an eNB to directly indicate a transmission resource of a D2D Tx UE in D2D communication is defined as Mode 1. And, a method for a UE to directly select a transmission resource, when a transmission resource region is configured in advance or an eNB designates a transmission resource region, is defined as Mode 2. In case of D2D discovery, a case that an eNB directly indicates a resource is defined as Type 2. And, a case that a UE directly selects a transmission resource from a previously configured resource region or a resource region indicated by an eNB is defined as Type 1.

Moreover, as described above, D2D may be called sidelink, SA may be called a Physical Sidelink Control Channel (PSCCH), D2D synchronization signal may be called Sidelink Synchronization Signal (SSS), control channel carrying most basic information, which is transmitted together with SSS before D2D communication, may be called a Physical Sidelink Broadcast Channel (PSBCH) or a Physical D2D Synchronization Channel (PD2DSCH).

Furthermore, a signal for a specific UE to announce that it is located nearby (here, ID of the specific UE may be included in this signal) or such a channel may be called a Physical Sidelink Discovery Channel (PSDCH).

According to LTE Rel-12, only a D2D UE transmits a PSBCH together with an SSS for D2D communication, and thus, SSS measurement is performed using a DMRS in the PSBCH. An out-coverage UE measures the DMRS in the PSBCH and determines whether to become a synchronization source by measuring RSRP of the DMRS.

It is expected that control and data channels coexist in V2X communication. It is assumed that when control and data channels are associated with each other, multiple vehicles transmit periodic messages. Assuming that a vehicle is a UE, the UE may know the resource locations of currently transmitted messages by decoding the control channel or performing energy sensing on the data channel. In addition, the UE may know even the resource locations to be used by other transmitting UEs.

When uplink, downlink, and sidelink are dynamically allocated to resources as in new RAT, it is difficult to reserve resources for a specific message (e.g., sidelink). To solve this problem, the present disclosure proposes to configure/apply a window on time or frequency resources in order to allow N or more resource units for a specific message (e.g., sidelink) to exist within the configured window.

For the new RAT, a method of using resources in a specific time-frequency period by changing their usage instead of fixing the resources as uplink or downlink resources has been discussed. The resources may be semi-statically changed by RRC signaling, or whether each slot or subframe is for uplink or downlink may be informed by performing signaling or transmitting a sequence in each slot or subframe.

For example, if downlink or uplink is dynamically allocated, it may guarantee flexibility in terms of resource management. To obtain the flexibility, sidelink needs to be allocated together with the downlink and uplink. However, when the sidelink is dynamically allocated together with the downlink and uplink, it may be difficult for a transmitting UE to reserve resources. For example, even if a transmitting UE reserves a resource to use it after t ms, the transmitting UE may not perform transmission if there is no sidelink at that time.

To solve the problem, a first embodiment of the present disclosure proposes to configure/apply a window on time or frequency resources in order to allow N or more resource units capable of transmitting a specific message (e.g., sidelink or uplink SPS) within the configured window.

FIRST EMBODIMENT

Method 1-1

After dividing time resources into several groups, each group may be configured to have at least N sidelink slots or subframes. Each time resource group may be composed of continuous time resources, and individual time resource groups may be configured such that they are discontinuous or overlap with each other. In addition, each time resource group may be configured to have the same size for equal division.

Figure 12:
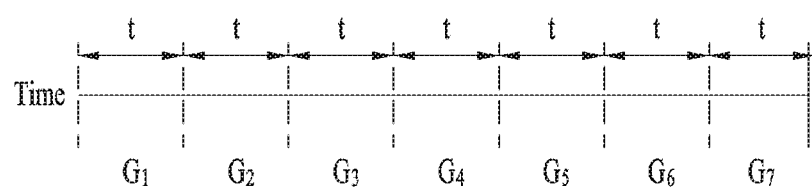
FIG. 12 is a reference diagram for explaining a time resource group for transmitting a sidelink message according to an embodiment of the present disclosure.

FIG. 12 illustrates grouping of time resources. Referring to FIG. 12, time resources are grouped into continuous time groups, each of which has a size of t ms. Each time group may be configured to include at least N sidelink slots or subframes. When a Base Station (BS) dynamically allocates uplink, downlink, and sidelink resources, the BS may manage the resources such that each time group has at least N sidelink slots or subframes.

The size of each time group, the interval between time groups, or the number of sidelink slots or subframes in each time group may be configured when a resource pool is configured or changed after the resource pool is configured. The reason why it is changed after the configuration of the resource pool is to adjust the amount of sidelink resources based on the amount of sidelink traffic.

Method 1-2

After dividing frequency resources into several groups, each group may be configured to have at least M sidelink resource blocks. Each frequency resource group may be composed of continuous frequency resources, and individual frequency resource groups may be configured such that they are discontinuous or overlap with each other. In addition, each frequency resource group may be configured to have a different size to use a certain range of frequency resources as sidelink resources more efficiently.

Figure 13:
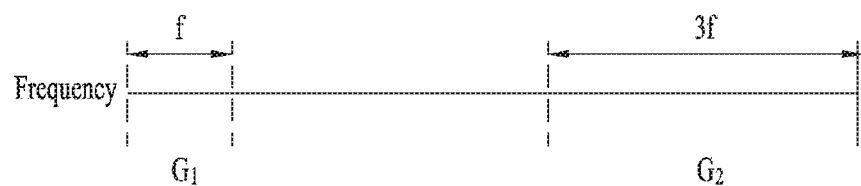
FIG. 13 is a reference diagram for explaining a frequency resource group for transmitting a sidelink message according to an embodiment of the present disclosure.

FIG. 13 illustrates grouping of frequency resources. Referring to FIG. 13, two frequency resource groups include continuous frequency resources with a size of f and continuous frequency resources with a size of 3f, respectively, and the two frequency resource groups are discontinuous. Each frequency resource group may be configured to have at least M sidelink resource blocks (that is, M=m in the case of group G1 and M=3 m in the case of group G2). When a BS dynamically allocates uplink, downlink, and sidelink resources, the BS may manage the resources such that each frequency group has at least M sidelink resource blocks (that is, M=m in the case of group G1 and M=3 m in the case of group G2).

The size of each frequency group, the interval between frequency groups, or the number of resource blocks in each frequency group may be configured when a resource pool is configured or changed after the resource pool is configured. The reason why it is changed after the configuration of the resource pool is to adjust the amount of sidelink resources based on the amount of sidelink traffic.

Method 1-3

The time resource grouping of method 1-1 and the frequency resource grouping of method 1-3 may be separately defined and independently managed. In addition, by grouping time and frequency resources together, each time-frequency resource may be configured to have L time-frequency blocks.

The size of each time-frequency group, the time-frequency interval between time-frequency groups, or the number L of time-frequency blocks in each time-frequency group may be configured when a resource pool is configured or changed after the resource pool is configured. The reason why it is changed after the configuration of the resource pool is to adjust the amount of sidelink resources based on the amount of sidelink traffic.

Method 1-4

In the first embodiment of the present disclosure, when uplink, downlink, and sidelink resources are dynamically allocated, it is desirable to indicate whether a specific resource is for uplink, downlink, or sidelink using a resource (e.g., RRC signaling, downlink control information, etc.) earlier in time than the corresponding resource. The reason for this is that when it is informed that the current resource is for uplink, downlink, or sidelink, it may be difficult to immediately perform transmission. If a BS informs dynamic resource allocation information on dynamic allocation of slots or subframes until next RRC signaling (i.e., whether the slots or subframes are for uplink, downlink, or sidelink) through RRC signaling in a semi-static manner, a UE may obtain the dynamic resource allocation information in advance based on the signaling. To this end, by observing the Discontinuous Reception (DRX) cycle of the UE, the BS may transmit the RRC signaling when the UE is awake. Alternatively, the BS may transmit the RRC signaling several times to assist the UE in receiving the RRC signaling.

In addition, the BS may inform dynamic resource allocation information on the current slot or subframe by transmitting control signaling in a slot or subframe earlier in time than the current slot or subframe. When the dynamic resource allocation information is transmitted via the control signaling, if the BS informs the location of sidelink, uplink, or downlink in a resource group according to the first embodiment of the present disclosure, a UE that does not know the location of the sidelink, uplink, or downlink in the resource group due to failure in monitoring all control channels in spite of knowing the usage types of resources (i.e., uplink, downlink, and sidelink) may obtain the location of the sidelink, uplink, or downlink in the resource group.

Method 1-5

When the first embodiment of the present disclosure is applied (or when the locations of sidelink resources are informed in advance using a bitmap), a transmitting UE may reserve an K1-th sidelink slot or subframe (or an K2-th frequency resource block or an K3-th time-frequency block) in a T-th time resource group (or an F-th frequency resource group or an TF-th time-frequency resource group).

In the case of periodic transmission, the resource reservation may mean that resources to be used in each cycle are reserved. Meanwhile, in the case of HARQ ACK/NACK operation for one Transport Block (TB), the resource reservation may mean that resources for retransmission are reserved.

Figure 14:
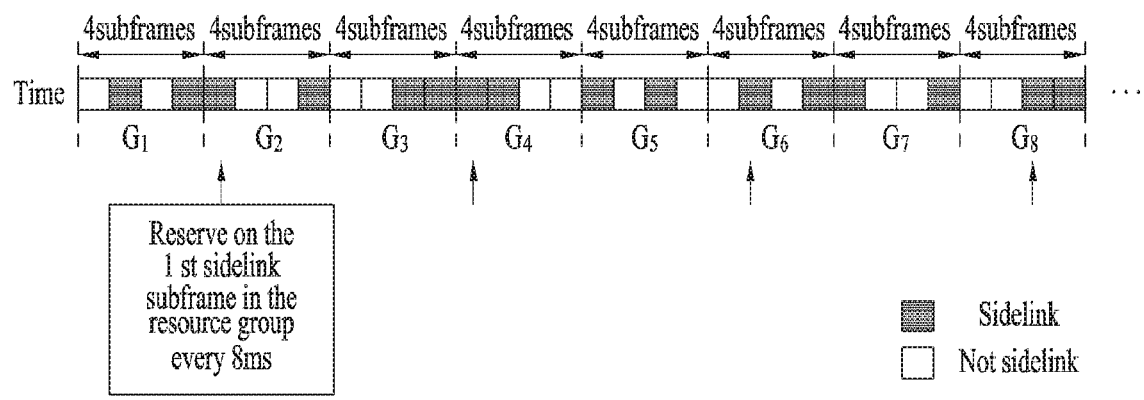
FIGS. 14 and 15 are reference diagrams for explaining transmission of a sidelink message according to an embodiment of the present disclosure.

FIG. 14 is a diagram illustrating transmission of a sidelink message according to an embodiment of the present disclosure. In FIG. 14, it is assumed that based on the time resource grouping of method 1-1, each time resource group is composed of 4 subframes, the interval between time resource groups is 0, and each time group has 2 sidelink subframes. In this case, assuming that each of the 4 subframes in the resource group has one of the usage types: uplink; downlink; and sidelink due to dynamic allocation of uplink, downlink, and sidelink resources, the usage type of a subframe may be informed by the first symbol of the corresponding subframe or a subframe earlier in time than the corresponding subframe.

If a transmitting UE intends to transmit a message in sidelink based on the configuration shown in FIG. 14, the transmitting UE may perform periodic transmission with a periodicity of 8 ms. In this case, one subframe is assumed to be 1 ms. Then, the transmitting UE needs to reserve sidelink resources to transmit the message with the periodicity of 8 ms, but the transmitting UE does not know which resources are for sidelink due to the dynamic allocation. Thus, the transmitting UE may reserve the first sidelink subframe every two resource groups to roughly maintain the 8 ms periodicity. The transmitting UE performs blind detection to know which one of the usage types: uplink; downlink; and sidelink each subframe of which the usage type is variable due to the dynamic allocation has, detects which subframe is the first sidelink subframe every two resource groups, and then transmits the message in the detected subframes. A receiving UE also performs the blind detection to know which one of the usage types: uplink; downlink; and sidelink each subframe of which the usage type is variable due to the dynamic allocation has. In the case of broadcast, to receive all the sidelink, the receiving UE detects which subframe is a sidelink subframe in each resource group and then receive the message in the detected subframes. In the case of unicast transmission, the corresponding receiving UE detects which subframe is the first sidelink subframe every two resource groups and then receives the message in the detected subframes.

The above-described operation may be equally applied to methods 1-2 and 1-3. Further, when the locations of sidelink resources are indicated as a bitmap via RRC signaling or on a control channel, transmitting and receiving UEs may perform the above-described operation without blind detection for the usage types.

Figure 15:
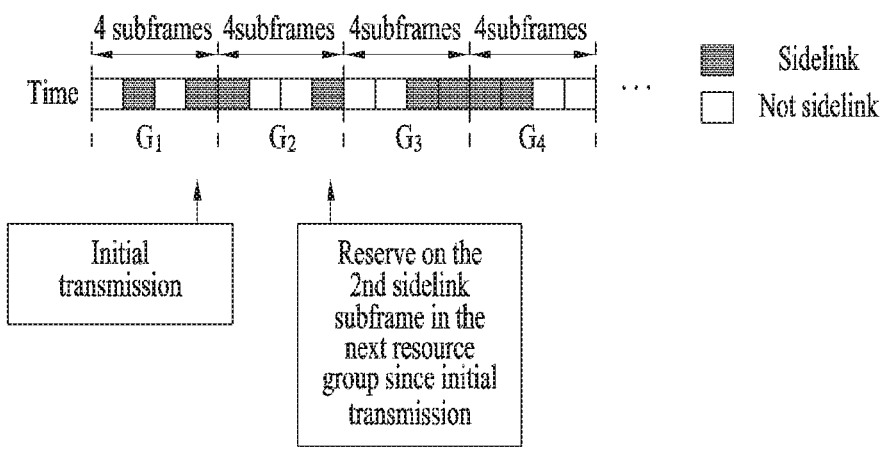

FIG. 15 is a diagram illustrating an embodiment of the present disclosure where initial transmission is considered.

In FIG. 15, it is assumed that based on the time resource grouping of method 1-1, each time resource group is composed of 4 subframes, the interval between time resource groups is 0, and each time group has 2 sidelink subframes. In this case, assuming that each of the 4 subframes in the resource group has one of the usage types: uplink; downlink; and sidelink due to dynamic allocation of uplink, downlink, and sidelink resources, the usage type of a subframe may be informed by the first symbol of the corresponding subframe or a subframe earlier in time than the corresponding subframe.

If a transmitting UE intends to transmit a message in sidelink based on the configuration shown in FIG. 15, the transmitting UE may reserve the locations of resources for retransmission while performing initial transmission, but the transmitting UE does not know which resources are for sidelink due to the dynamic allocation. In this case, it is assumed that latency is 5 ms and the retransmission is performed at most one time. Then, it is expected that for the retransmission, the transmitting UE may reserve the first subframe of resource group G3 after 5 ms from the second sidelink resource of resource group G1, where the transmission UE performs the transmission, in order to roughly maintain the latency of 5 ms. However, the first subframe of resource group G3 is not currently a sidelink resource, and it may be unavailable when the transmitting UE makes the reservation. As a result, if the transmitting UE reserves the first sidelink resource of resource group G3 as the retransmission resource, the latency requirements may not be satisfied. Therefore, the transmitting UE reserves the second sidelink resource of resource group G2 as the retransmission resource. The transmitting UE performs blind detection to know which one of the usage types: uplink; downlink; and sidelink each subframe of which the usage type is variable due to the dynamic allocation has, detects which subframe is the second sidelink subframe of resource group G2, and then transmits the message in the detected subframe. A receiving UE also performs the blind detection to know which one of the usage types: uplink; downlink; and sidelink each subframe of which the usage type is variable due to the dynamic allocation has. When transmitting a NACK, the receiving UE detects which subframe is a sidelink subframe of resource group G2 and then receives the message on the second sidelink resource.

The above-described operation may be equally applied to methods 1-2 and 1-3. Further, when the locations of sidelink resources are indicated as a bitmap via RRC signaling or on a control channel, transmitting and receiving UEs may perform the above-described operation without blind detection for the usage types.

Since it is difficult to anticipate the locations of sidelink resources, there may occur a problem in reservation. However, such a problem may be solved by applying method 1-5. When sidelink resources are dynamically allocated, if the present disclosure is not applied, resource reservation may not be made since it is difficult to know where the sidelink resources are placed.

Method 1-6

When method 1-5 is applied, UEs at a cell boundary may use sidelink resources of a serving cell but may need to receive even on sidelink resources of a neighboring cell. For example, when vehicles exchange safety messages for V2X services using sidelink resources, the vehicles should hear messages transmitted on sidelink resources of vehicles in a neighboring cell. However, when uplink, downlink, and sidelink resources are dynamically allocated, it may be difficult to find the sidelink resources since sidelink resources of a neighboring cell are also dynamically allocated. Accordingly, the serving cell needs to broadcast information on the dynamic allocation of the sidelink resources of the neighboring cell.

The information on the dynamic sidelink allocation, that is, the sidelink resources of the neighboring cell are located in which subframes and at which frequencies may be indicated using a bitmap. However, assuming that all neighboring cells provide their information through bitmaps, the amount of broadcast information may be extremely increased.

Assuming that the first embodiment of the present disclosure is applied, a serving cell may broadcast to UEs configuration information of a neighboring cell indicating how many sidelink resources exist in each resource group as described above. Then, receiving UEs perform blind detection to know at which locations the sidelink resources are placed in each resource group of the neighboring cell and then receive messages on the corresponding resources. The usage type of a subframe may be indicated by the first symbol of the corresponding subframe or a subframe earlier in time than the corresponding subframe.

Further, a UE may receive dynamic resource allocation information of a neighboring cell through backhaul signaling between BSs. Detail will be described later with reference to a third embodiment.

SECOND EMBODIMENT

Hereinafter, uplink SPS operation will be described with reference to a second embodiment of the present disclosure.

Method 2-1

After dividing time resources into several groups, each group may be configured to have at least N uplink slots or subframes. Each time resource group may be composed of continuous time resources, and individual time resource groups may be configured such that they are discontinuous or overlap with each other. In addition, each time resource group may be configured to have the same size for equal division.

Figure 16:
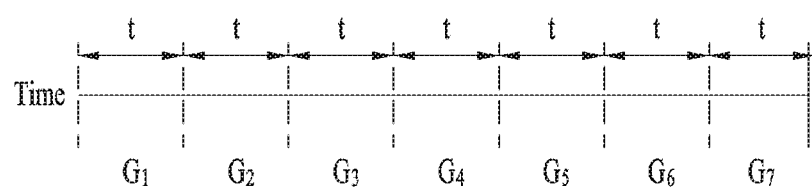
FIG. 16 is a reference diagram for explaining a time resource group for transmitting a message for uplink SPS according to an embodiment of the present disclosure.

FIG. 16 illustrates grouping of time resources. Referring to FIG. 16, time resources are grouped into continuous time groups, each of which has a size of t ms. Each time group may be configured to include at least N uplink slots or subframes. When a BS dynamically allocates uplink, downlink, and sidelink resources, the BS may manage the resources such that each time group has at least N uplink slots or subframes.

The size of each time group, the interval between time groups, or the number of uplink slots or subframes in each time group may be configured when a resource pool is configured or changed after the resource pool is configured. The reason why it is changed after the configuration of the resource pool is to adjust the amount of uplink resources based on the amount of uplink traffic.

Method 2-2

After dividing frequency resources into several groups, each group may be configured to have at least M uplink resource blocks. Each frequency resource group may be composed of continuous frequency resources, and individual frequency resource groups may be configured such that they are discontinuous or overlap with each other. In addition, each frequency resource group may be configured to have a different size to use a certain range of frequency resources as uplink resources more efficiently.

Figure 17:
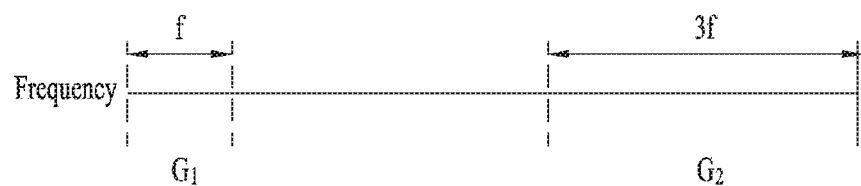
FIG. 17 is a reference diagram for explaining a frequency resource group for transmitting a message for uplink SPS according to an embodiment of the present disclosure.

FIG. 17 illustrates grouping of frequency resources. Referring to FIG. 17, two frequency resource groups include continuous frequency resources with a size of f and continuous frequency resources with a size of 3f, respectively, and the two frequency resource groups are discontinuous. Each frequency resource group may be configured to have at least M uplink resource blocks (that is, M=m in the case of group G1 and M=3 m in the case of group G2). When a BS dynamically allocates uplink, downlink, and sidelink resources, the BS may manage the resources such that each frequency group has at least M uplink resource blocks (that is, M=m in the case of group G1 and M=3 m in the case of group G2).

The size of each frequency group, the interval between frequency groups, or the number of resource blocks in each frequency group may be configured when a resource pool is configured or changed after the resource pool is configured. The reason why it is changed after the configuration of the resource pool is to adjust the amount of uplink resources based on the amount of uplink traffic.

Method 2-3

The time resource grouping of method 2-1 and the frequency resource grouping of method 2-3 may be separately defined and independently managed. In addition, by grouping time and frequency resources together, each time-frequency resource may be configured to have L time-frequency blocks.

The size of each time-frequency group, the time-frequency interval between time-frequency groups, or the number L of time-frequency blocks in each time-frequency group may be configured when a resource pool is configured or changed after the resource pool is configured. The reason why it is changed after the configuration of the resource pool is to adjust the amount of uplink resources based on the amount of uplink traffic.

Method 2-4

In the second embodiment of the present disclosure, when uplink, downlink, and sidelink resources are dynamically allocated, it is desirable to indicate whether a specific resource is for uplink, downlink, or sidelink using a resource (e.g., RRC signaling, downlink control information, etc.) earlier in time than the corresponding resource. The reason for this is that when it is informed that the current resource is for uplink, downlink, or sidelink, it may be difficult to immediately perform transmission. If a BS informs dynamic resource allocation information on dynamic allocation of slots or subframes until next RRC signaling (i.e., whether the slots or subframes are for uplink, downlink, or sidelink) through RRC signaling in a semi-static manner, a UE may obtain the dynamic resource allocation information in advance based on the signaling. To this end, by observing the Discontinued Reception (DRX) cycle of the UE, the BS may transmit the RRC signaling when the UE is awake. Alternatively, the BS may transmit the RRC signaling several times to assist the UE in receiving the RRC signaling.

In addition, the BS may inform dynamic resource allocation information on the current slot or subframe by transmitting control signaling in a slot or subframe earlier in time than the current slot or subframe. When the dynamic resource allocation information is transmitted via the control signaling, if the BS informs the location of sidelink, uplink, or downlink in a resource group according to the second embodiment of the present disclosure, a UE that does not know the location of the sidelink, uplink, or downlink in the resource group due to failure in monitoring all control channels in spite of knowing the usage types of resources (i.e., uplink, downlink, and sidelink) may obtain the location of the sidelink, uplink, or downlink in the resource group.

Method 2-5

When the second embodiment of the present disclosure is applied (or when the locations of uplink resources are informed in advance using a bitmap), if a transmitting UE intends to use resources periodically for Semi-Persistent scheduling (SPS), the transmitting UE may reserve an K1-th uplink slot or subframe (or an K2-th frequency resource block or an K3-th time-frequency block) in a T-th time resource group (or an F-th frequency resource group or an TF-th time-frequency resource group).

In the case of periodic transmission, the use of resources may mean that the resources are used in each cycle. Meanwhile, in the case of HARQ ACK/NACK operation for one TB, the use of resources may mean that a BS allocates the resources for retransmission.

Figure 18:
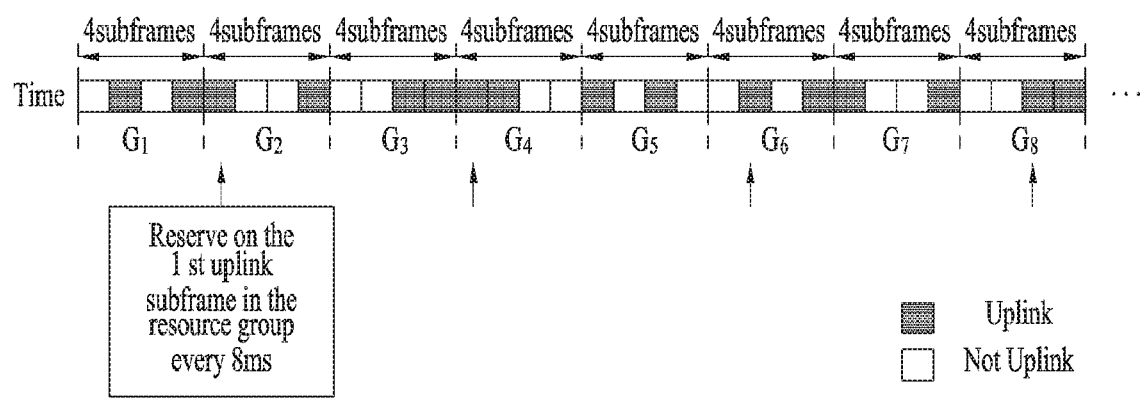
FIGS. 18 and 19 are reference diagrams for explaining transmission of a message for uplink SPS according to an embodiment of the present disclosure.

FIG. 18 is a diagram illustrating message transmission for uplink SPS according to an embodiment of the present disclosure.

In FIG. 18, it is assumed that based on the time resource grouping of method 2-1, each time resource group is composed of 4 subframes, the interval between time resource groups is 0, and each time group has 2 uplink subframes. In this case, each of the 4 subframes in the resource group may have one of the usage types: uplink; downlink; and sidelink due to dynamic allocation of uplink, downlink, and sidelink resources. Thus, the usage type of a subframe may be informed by the first symbol of the corresponding subframe or a subframe earlier in time than the corresponding subframe. If a transmitting UE intends to transmit a message in uplink based on the configuration shown in FIG. 18, the transmitting UE may perform periodic transmission with a periodicity of 8 ms. In this case, one subframe is assumed to be 1 ms. Then, the transmitting UE needs to use uplink resources to transmit the message with the periodicity of 8 ms, but the transmitting UE does not know which resources are for uplink due to the dynamic allocation. Thus, the transmitting UE may use the first uplink subframe every two resource groups to roughly maintain the period of 8 ms.

The transmitting UE performs blind detection to know which one of the usage types: uplink; downlink; and sidelink each subframe of which the usage type is variable due to the dynamic allocation has, detects which subframe is the first uplink subframe every two resource groups, and then transmits the message in the detected subframes. The above-described operation may be equally applied to methods 2-2 and 2-3. Further, when the locations of uplink resources are indicated as a bitmap via RRC signaling or on a control channel, transmitting and receiving UEs may perform the above-described operation without blind detection for the usage types.

Figure 19:
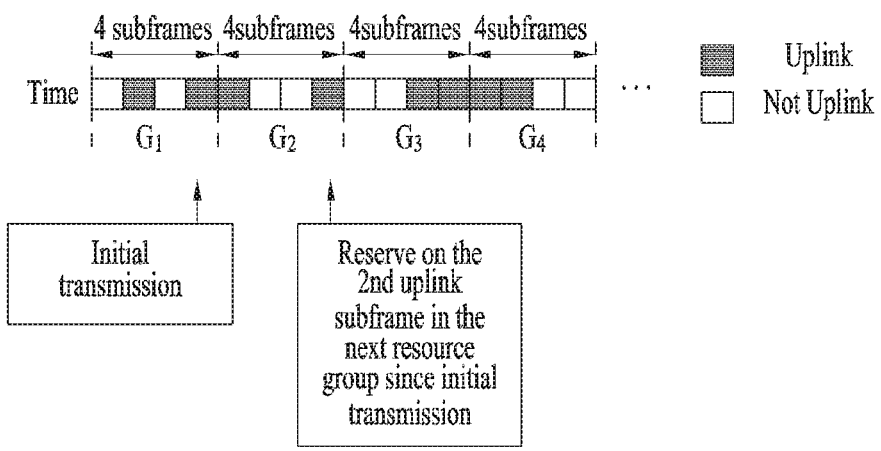

FIG. 19 is a diagram illustrating an embodiment of the present disclosure where initial transmission is considered. In FIG. 19, it is assumed that based on the time resource grouping of method 2-1, each time resource group is composed of 4 subframes, the interval between time resource groups is 0, and each time group has 2 sidelink subframes. In this case, assuming that each of the 4 subframes in the resource group has one of the usage types: uplink; downlink; and sidelink due to dynamic allocation of uplink, downlink, and sidelink resources, the usage type of a subframe may be informed by the first symbol of the corresponding subframe or a subframe earlier in time than the corresponding subframe. If a transmitting UE intends to transmit a message in uplink based on the configuration shown in FIG. 19, a BS needs to inform the locations of resources for retransmission while the transmitting UE performs initial transmission, but the BS may not yet determine which resources are to be used for uplink due to the dynamic allocation. In this case, it is assumed that latency is 5 ms and the retransmission is performed at most one time. Then, it is expected that for the retransmission, the BS may allocate the first subframe of resource group G3 after 5 ms from the second uplink resource of resource group G1, where the transmission is performed, to roughly maintain the latency of 5 ms. However, the first subframe of resource group G3 is not currently an uplink resource, and it may be unavailable when the BS indicates the retransmission. As a result, if the first uplink resource of resource group G3 is used as the retransmission resource, the latency requirements may not be satisfied. Therefore, the second uplink resource of resource group G2 is reserved as the retransmission resource. The transmitting UE performs blind detection to know which one of the usage types: uplink; downlink; and sidelink each subframe of which the usage type is variable due to the dynamic allocation has, detects which subframe is the second uplink subframe of resource group G2, and then transmits the message in the detected subframe. The BS also performs the blind detection to know which one of the usage types: uplink; downlink; and sidelink each subframe of which the usage type is variable due to the dynamic allocation has. When transmitting a NACK, the BS receives the message on the second uplink resource. The above-described operation may be equally applied to methods 2-2 and 2-3. Further, when the locations of uplink resources are indicated as a bitmap via RRC signaling or on a control channel, a transmitting UE may perform the above-described operation without blind detection for the usage types.

Since it is difficult to anticipate the locations of uplink resources, there may be a problem in using the same link types of resources several times. However, such a problem can be solved by the present disclosure. When uplink resources are dynamically allocated and transmission is performed multiple times, if the present disclosure is not applied, it may be impossible to design resources for next transmission since it is difficult to know where uplink resources are placed.

Although the second embodiment is described based on the uplink SPS, it is also applicable to resource allocation for other periodic transmission. For example, the second embodiment may be applied to sidelink SPS allocation, periodic allocation of RACH resources, resource allocation for periodic CSI reporting, etc.

Further, a UE may receive dynamic resource allocation information of a neighboring cell through backhaul signaling between BSs. Detail will be described later with reference to the third embodiment.

THIRD EMBODIMENT

In the third embodiment of the present disclosure, sidelink communication in New RAT (NR) where uplink, downlink, and sidelink are dynamically allocated will be described. In particular, regarding sidelink communication between UEs served by different BSs, a method of transmitting information on allocation of HARQ retransmission resources will be described.

In the NR, an environment in which uplink, downlink, and sidelink are dynamically changed depending on the types and amount of data, time, or frequency is in discussion. In addition, not only an environment in which BSs establish these links independently or use the same links but also an environment in which the links are established on a specific group basis such as BSs, sectors, etc. are also discussed in the NR. Meanwhile, in V2X communication through sidelink, a transmitting UE may be allocated resources for initial transmission together with resources for HARQ retransmission, and a receiving UE should know the locations of the resources for the HARQ retransmission.

In some cases, the resource locations for the HARQ retransmission may be indirectly provided. Thus, the receiving UE should be able to obtain dynamic resource allocation information of a BS to which the transmitting UE is connected in order to estimate the absolute resource locations for the HARQ retransmission.

In the case of sidelink communication between UEs served by different BSs, if the BSs have the same dynamic resource allocation information or if dynamic resource allocation information is provided on a group basis such BSs, sectors, etc., UEs belonging to the same group may obtain dynamic resource allocation information of a BS serving other UEs, which the UEs intend to perform the sidelink communication with, by obtaining dynamic resource allocation information of their serving BS. Meanwhile, dynamic resource allocation information may be independently configured, or BSs belonging to different groups may have different configurations regarding communication between UEs. In this case, to perform HARQ retransmission, a receiving UE should be able to obtain dynamic resource allocation information of a BS to which a transmitting UE is connected. The environment in which resources are dynamically allocated may be divided into Cases 1 to 3 as follows.

Case 1: A case in which BSs or sectors have the same resource-use configuration for sidelink BSs or sectors do not need to exchange or transfer dynamic resource allocation information.

Except for the sidelink configuration, other configurations (e.g., downlink configuration, uplink configuration, etc.) may be different.

A UE may automatically obtain the configuration of a designated cell by reading and using the configuration of its serving cell.

It can be generalized as follows: the configuration of cell 1 is interconnected to that of cell 2. For example, a subframe next to the subframe configured for sidelink in cell 1 may be always configured for sidelink in cell 2.

Case 2.A: A case in which adjacent BSs or sectors have the same resource-use configuration for sidelink on a group basis—communication between UEs served by different BSs belonging to the same group BSs or sectors do not need to exchange or transfer dynamic resource allocation information.

Except for the sidelink configuration, other configurations (e.g., downlink configuration, uplink configuration, etc.) may be different.

A UE may automatically obtain the configuration of a designated cell by reading and using the configuration of its serving cell.

It can be generalized as follows: the configuration of cell 1 is interconnected to that of cell 2. For example, a subframe next to the subframe configured for sidelink in cell 1 may be always configured for sidelink in cell 2.

Case 2.B: A case in which adjacent BSs or sectors have the same resource-use configuration for sidelink on a group basis—communication between UEs served by different BSs belonging to different groups BSs or sectors need to exchange or transfer dynamic resource allocation information.

Uplink or downlink information of a BS to which a transmitting UE is connected is not required.

Link information of another BS may be obtained using the following methods.

Case 3: A case in which all BSs or sectors configure sidelink independently from each other BSs or sectors need to exchange or transfer dynamic resource allocation information.

Uplink or downlink information of a BS to which a transmitting UE is connected is not required.

Link information of another BS may be obtained using the following methods.

Hereinafter, a method of transmitting sidelink resource allocation information of a transmitting UE to a receiving UE served by another BS when dynamic resource allocation information on uplink, downlink, or sidelink of a BS is transmitted through a higher layer signal or control information in a slot or subframe will be described.

Method 3-1

A case in which dynamic resource allocation information is transmitted through a higher layer signal (e.g., RRC signaling)

Step 3-1-A: BS 1 transmits information including its dynamic resource-use configuration for uplink/downlink/sidelink from time n+v to time n+w to transmitting UE 1 through a higher layer signal (e.g., RRC signaling) at random time n, where each of v and w is a time value greater than 0. Specifically, v indicates time delay from the time when UE 1 receives the dynamic resource allocation information transmitted from BS 1 to the time when UE 1 can use the information, and w indicates the length of time during which BS 1 holds dynamic resource allocation information on uplink/downlink/sidelink for a link to be established. In this case, w may be smaller than, equal to, or greater than the UEs' maximum delay time allowed for retransmission, d.

Step 3-1-B: BS 1 transmits dynamic resource allocation information on uplink/downlink/sidelink for links until time n+b to neighboring BS 2 through an inter-BS interface, where b is a time value greater than 0. The link transmission may be periodic transmission with a periodicity of b, or it may be performed by requests from UEs or another BS. This step may be equally applied when resources are grouped on a subframe or slot basis.

Step 3-1-C: Upon receiving the information including the resource-use configuration until time n+b from BS 1, BS 2 forwards the information to receiving UE 2 through higher layer signaling (e.g., RRC signaling). The transmission may be periodically performed. However, when the transmission is aperiodically performed, it may be performed by requests from UEs or autonomously by the BS.

Step 3-1-D: To transfer data to receiving UE 2 served by BS 2, UE 1 may be allocated sidelink resources based on the dynamic resource allocation information received from BS 1 or autonomously allocate the sidelink resources. Assuming that initial transmission time and retransmission time are n+t and n+t+r, respectively, retransmission delay time, r should be smaller than d. If r is equal to or smaller than w−t, retransmission may be performed at an absolute location. On the other hand, if r is greater than w−t, the location or index of a group where the retransmission is to be performed or the order of sidelink resources in the corresponding group may be indirectly determined using grouping performed on a subframe or slot basis.

Step 3-1-E: UE 1 transmits first data on the allocated resources at time n+t. In this case, UE 1 informs the locations of retransmission resources for an NACK on a sidelink control channel. If UE 1 informs the absolute locations of the retransmission resources for the NACK since r is equal to or smaller than w−t, UE 2 may know the retransmission location with no additional process. However, when UE 1 indirectly informs the locations of the retransmission resources using resource grouping since r is greater than w−t, UE 2 may estimate the retransmission location using the dynamic resource allocation information of BS 1 received in step 3-1-B.

Method 3-2

When dynamic resource allocation information is transmitted through control information in a slot or subframe, the third embodiment of the present disclosure is applied.

Step 3-2-A: BS 1 has dynamic resource allocation information on uplink/downlink/sidelink until time n+w at random time n, where w is a value greater than 0 and indicates the length of time during which BS 1 holds dynamic resource allocation information on uplink/downlink/sidelink for a link to be established. More specifically, w is a time value greater than 0. BS 1 transmits, to transmitting UE 1 that BS 1 currently serves, dynamic resource allocation information on uplink/downlink/sidelink at time n+a on a control channel. That is, BS 1 transmits, to its served UEs, dynamic resource allocation information on uplink, downlink, or sidelink after time a from current time n, where a may be allocated dynamically for uplink/downlink/sidelink or predetermined. In general, the value of a is smaller than that of w or d.

Step 3-2-B: BS 1 transmits dynamic resource allocation information on uplink/downlink/sidelink until time n+b to adjacent BS 2 through an inter-BS interface, where b is a time value greater than 0 and smaller than w. In addition, the dynamic resource allocation information may be transmitted periodically with a periodicity of b, or it may be transmitted by requests from UEs or another BS. This step may be equally applied when resources are grouped on a subframe or slot basis.

Step 3-2-C: Upon receiving the information including the dynamic resource-use configuration for uplink/downlink/sidelink until time n+b from BS 1, BS 2 forwards the information to receiving UE 2 through a higher layer signal. The transmission may be periodically performed. However, when the transmission is aperiodically performed, it may be performed by requests from UEs or autonomously by the BS.

Step 3-2-D: To transfer data to receiving UE 2 served by BS 2, UE 1 may be allocated sidelink resources based on the dynamic resource allocation information received from BS 1 or autonomously allocate the sidelink resources. Assuming that initial transmission time and retransmission time are n+t and n+t+r, respectively, retransmission delay time, r should be smaller than d. If r is equal to or smaller than a−t, retransmission may be performed at an absolute location. On the other hand, if r is greater than a−t, the location or index of a group where the retransmission is to be performed or the order of sidelink resources in the corresponding group may be indirectly determined using grouping performed on a subframe or slot basis.

Step 3-2-E: UE 1 transmits first data on the allocated resources at time n+t. In this case, UE 1 informs the locations of retransmission resources for an NACK on a sidelink control channel. If UE 1 informs the absolute locations of the retransmission resources for the NACK since r is equal to or smaller than a−t, UE 2 may know the retransmission location with no additional process. However, when UE 1 indirectly informs the locations of the retransmission resources using resource grouping since r is greater than a−t, UE 2 may estimate the retransmission location using the dynamic resource allocation information of BS 1 received in step 3-2-B.

Although the third embodiment is described based on initial transmission and retransmission for the initial transmission, it is also applicable to the retransmission for the initial transmission and retransmission for the initial retransmission. Further, BS 2 may inform not only UE 2 that BS 2 currently serves but also other UEs of dynamic resource allocation information on uplink/downlink/sidelink for UE 1, and the UEs may act as relays using the dynamic resource allocation information.

Besides the above-described method, UEs at a cell boundary may obtain sidelink configuration information, which is uniquely allocated by a Connection Identifier (CID), by utilizing the CID of their serving BS or estimating the CIDs of neighboring BSs based on direction communication between BSs.

Figure 20:
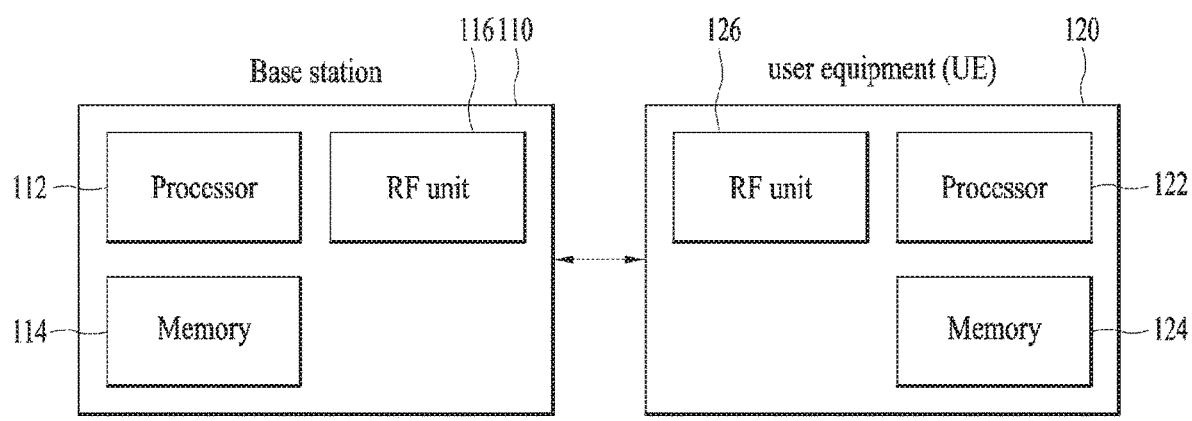
FIG. 20 shows a base station and a user equipment applicable to one embodiment of the present disclosure.

FIG. 20 illustrates a Base Station (BS) and a User Equipment (UE) applicable to an embodiment of the present disclosure.

Referring to FIG. 20, a wireless communication system includes a BS 110 and a UE 120. The BS 110 includes a processor 112, a memory 114 and an RF (radio frequency) unit 116. The processor 112 can be configured to implement the procedures and/or methods proposed in the present disclosure. The memory 114 is connected to the processor 112 and stores various kinds of information related to operations of the processor 112. The RF unit 116 is connected to the processor 112 and transmits and/or receives radio or wireless signals. The UE 120 includes a processor 122, a memory 124 and an RF unit 126. The processor 122 can be configured to implement the procedures and/or methods proposed in the present disclosure. The memory 124 is connected to the processor 122 and stores various kinds of information related to operations of the processor 122. The RF unit 126 is connected to the processor 122 and transmits and/or receives radio or wireless signals. The BS 110 and/or the UE 120 can have a single antenna or multiple antennas.

The above-described embodiments may correspond to combinations of elements and features of the present disclosure in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present disclosure by combining elements and/or features together in part. A sequence of operations explained for each embodiment of the present disclosure may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a BS can be performed by an upper node of the BS in some cases. In particular, in a network constructed with a plurality of network nodes including a BS, it is apparent that various operations performed for communication with a UE can be performed by a BS or other network nodes except the BS. In this case, the term "base station" can be replaced with terms such as "fixed station", "Node B", "eNodeB (eNB)", "access point", etc.

The embodiments of the present disclosure may be implemented using various means. For instance, the embodiments of the present disclosure may be implemented using hardware, firmware, software and/or any combinations thereof. In case of the implementation by hardware, one embodiment of the present disclosure may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present disclosure may be implemented by modules, procedures, and/or functions for performing the above-explained functions or operations. Software code may be stored in a memory unit and may be then driven by a processor.

The memory unit may be provided within or outside the processor to exchange data with the processor through the various means known to the public.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The method of transmitting and receiving a signal in a wireless communication system and apparatus therefor can be applied to various wireless communication systems.

What is claimed is:

1. A method of transmitting a sidelink signal by a User Equipment (UE) in a wireless communication system, the method comprising:

receiving, from a first Base Station (BS), a resource pool configuration indicating a plurality of resource groups for signal transmission and reception of the UE; and transmitting, to another UE, a sidelink message using a specific resource unit in a specific resource group among the plurality of resource groups indicated by the resource pool configuration based on dynamic resource allocation information, wherein each of the plurality of resource groups is configured by continuously allocating M resource units (where M is a natural number and M>0), wherein each of the plurality of resource groups is configured to have at least N sidelink resource units (where N is a natural number and N>0), wherein each of the resource units is configured for one of uplink, downlink, or sidelink, and wherein the dynamic resource allocation information indicates that the sidelink message is to be transmitted using a K-th resource unit (where K is a natural number and M>K>0) among resource units in the specific resource group, wherein the K-th resource unit corresponds to one of the at least N sidelink resource units, wherein the dynamic resource allocation information indicates the specific resource unit within a latency range.

2. The method of claim 1, wherein the dynamic resource allocation information is transmitted through Radio Resource Control (RRC) signaling.

3. The method of claim 1, wherein the dynamic resource allocation information further comprises dynamic resource allocation information for an external UE transmitted from a second BS to the first BS through backhaul signaling.

4. A User Equipment (UE) for transmitting a sidelink signal in a wireless communication system, the UE comprising:

a radio frequency transceiver: and a processor, the processor is configured to:

receive, from a first Base Station (BS), a resource pool configuration indicating a plurality of resource groups for signal transmission and reception of the UE; and transmit, to another UE, a sidelink message using a specific resource unit in a specific resource group among the plurality of resource groups indicated by the resource pool configuration based on dynamic resource allocation information, wherein each of the plurality of resource groups is configured by continuously allocating M resource units (where M is a natural number and M>0), wherein each of the plurality of resource groups is configured to have at least N sidelink resource units (where N is a natural number and N>0), wherein each of the resource units is configured for one of uplink, downlink, or sidelink, and wherein the dynamic resource allocation information indicates that the sidelink message is to be transmitted using a K-th resource unit (where K is a natural number and M>K>0) among resource units in the specific resource group, wherein the K-th resource unit corresponds to one of the at least N sidelink resource units, wherein the dynamic resource allocation information indicates the specific resource unit within a latency range.

5. The UE of claim 4, wherein the dynamic resource allocation information is transmitted through Radio Resource Control (RRC) signaling.

6. The UE of claim 4, wherein the dynamic resource allocation information further comprises dynamic resource allocation information for an external UE transmitted from a second BS to the first BS through backhaul signaling.

7. The UE of claim 4, wherein the UE is capable of communicating with at least one of the other UE, a UE related to an autonomous driving vehicle, a base station or a network.

* * * * *